Nov. 4, 1969    F. E. ARNOLD, JR    3,476,074
ANTENNA SELECTOR
Filed Oct. 30, 1967    2 Sheets-Sheet 1

INVENTOR:
FREDERIC E. ARNOLD

Nov. 4, 1969  F. E. ARNOLD, JR  3,476,074
ANTENNA SELECTOR

Filed Oct. 30, 1967  2 Sheets-Sheet 2

INVENTOR:
FREDERIC E. ARNOLD
Atty.

United States Patent Office 3,476,074
Patented Nov. 4, 1969

3,476,074
ANTENNA SELECTOR
Frederic E. Arnold, Jr., Rockford, Ill., assignor to Hydrometals, Inc., Dallas, Tex., a corporation of Illinois
Filed Oct. 30, 1967, Ser. No. 678,850
Int. Cl. G01d 21/02
U.S. Cl. 116—114          7 Claims

ABSTRACT OF THE DISCLOSURE

This antenna selector involves a transparent dial that is marked off in arcuate bands from its center on a scale corresponding to the scale of a map in connection with which it is used, on which the locations of UHF, VHF and FM TV stations are marked in relation to the dots marking the locations of towns and cities. The arcuate bands are numbered to correspond with numbers in a table of antenna models, the numbers assigned different models of antennas having ranges equivalent to the distances represented by the bands, so that one can determine by reference to the table after placing the dial on the map with the center on the dot for a given town or city and turning the dial which model antenna will be adequate in range to enable reception from whatever stations are designed by the customer for whom the antenna is being selected.

---

This invention relates to a TV antenna selector which is so designed that when the transparent selector dial marked off in two quadrants, one for UHF stations, the other for VHF and FM stations, and the other half for all channels, is placed with its center over a city's location on a map that has the various UHF, VHF and FM stations spotted all around the city's location, one can quickly determine with the selector what antenna is best for a given customer. For example, if the customer is looking for the best general results, then the "all channel" half of the selector will be used, noting which arcuate band on the selector takes in most of the important stations that the customer is interested in, each band on a larger radius naturally taking in stations located farther away and calling for a more expensive model antenna having a longer range, the bands being differently colored to facilitate checking on the various stations that can be reached with a given antenna by rotating the selector and noting whether the stations considered important come within the range of the antenna designated, and if not, an antenna having a longer range is to be recommended. The quadrants for UHF and VHF–FM, respectively, are also divided in bands and these are key numbered as are also the colored bands in the "all channel" half, so the person using the selector can quickly determine by reference to tables in which the different models of antennas are associated with the key numbers what model antenna should be chosen to best meet the needs of any given customer and will give the best assurance of satisfaction, far beyond what has heretofore been generally obtainable without this logical engineering approach to the problem.

Figure 1:
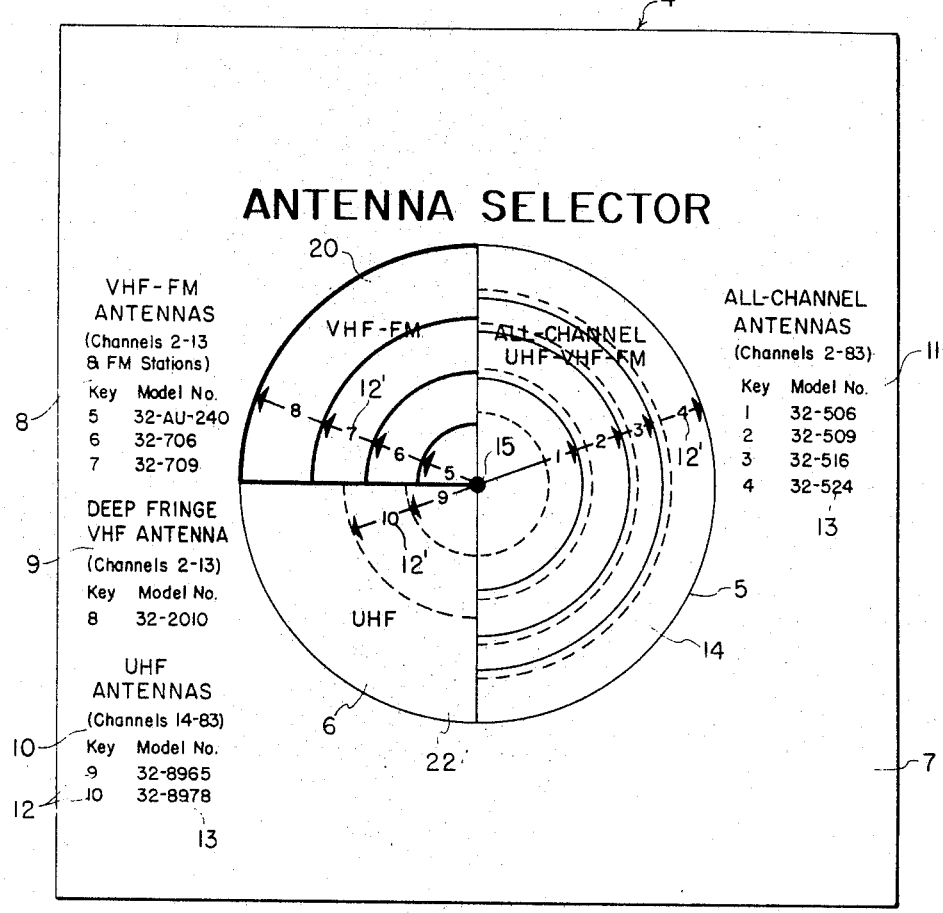
Figure 2:
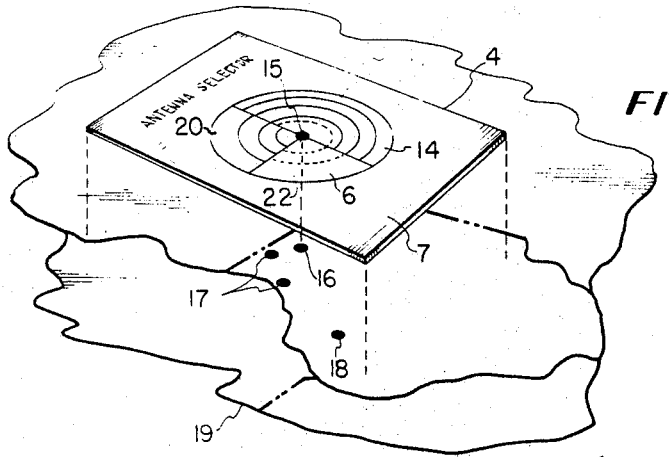
Figure 3:
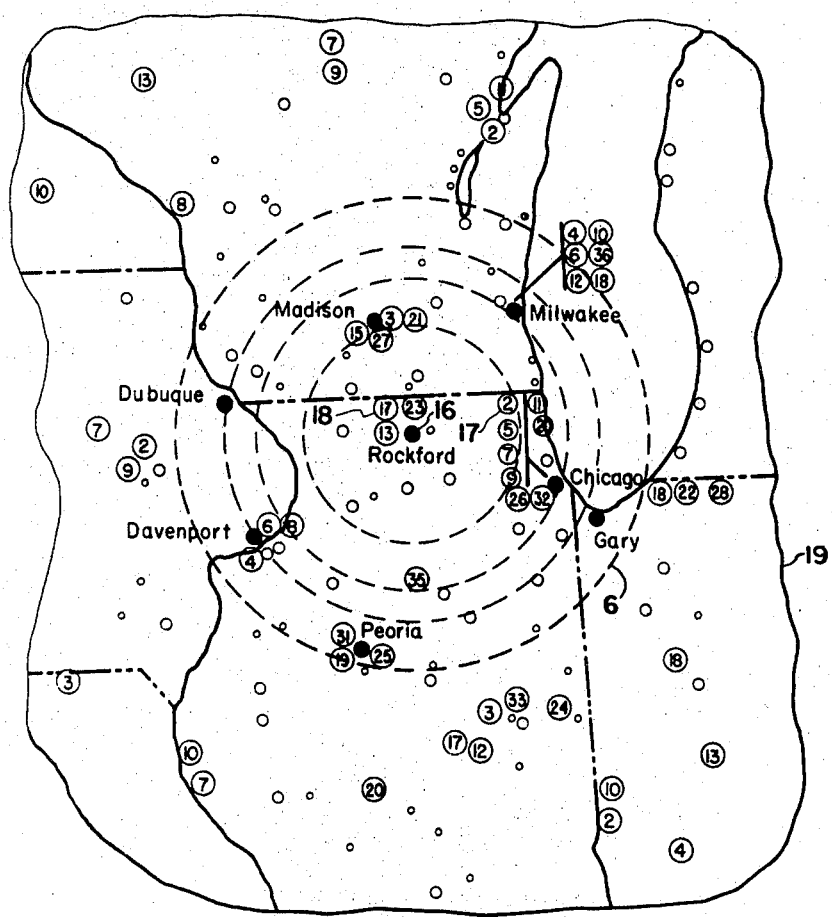

The invention is illustrated in the accompanying drawings, in which:

FIG. 1 is a face view of my antenna selector dial and table combination;

FIG. 2 is a perspective view of the antenna selector shown disposed over a map and about to be placed on the map with the center of the dial on a given city's location to enable choosing the correct antenna by rotating the selector to the position that includes the stations the customer wishes to receive, and FIG. 3 is an illustration of a typical map with VHF, UHF and FM stations spotted thereon, this map being on the same scale as FIG. 1 with a dotted circle drawn about the Rockford location to represent the antenna selector dial and enable better visualizing how the antenna selector is used.

The same reference numerals are applied to corresponding parts in the three views.

Referring to the drawings, the reference numeral 4 shows a substantially square card of clear transparent plastic material the central circular area 5 of which is left transparent and marked off to serve as the circular dial numbered 6, all of the area 7 around the dial being rendered opaque by a lithographic process on the back to show the tables numbered 8 to 11, black on a white background, or vice versa, so that the key numbers 12 in these tables corresponding to the numbers 12′ on the dial 6 are easily readable to identify the model numbers 13 for the various antennas available. Each antenna with a lower key number has less range of signal reception than one of a higher key number. Accordingly, in the semi-circular half 14 of the dial, labelled "All Channel UHF–VHF–FM" the shortest range is numbered 1, the next longer one 2, the next 3, and the longest 4, and, assuming most of the stations the customer wants to receive fall within the bands of radii numbered 1 and 2, the model antenna for that customer is #32–509. However, if a little longer range is necessary to take in some farther stations that fall within the band of longer radius 3, then the customer should have the model antenna numbered 32–516, or if still further range is desired falling within radius 4, the model needed is #32–524. Some customers interested only in short range reception falling within the radius 1, will be satisfied with antenna model #32–506. The dial in the use thereof is turned about its center dot 15 laid over the dot 16 on the map showing the town's or city's location and then the red dots 17 for VHF stations and green dots 18 for UHF stations that appear on the map 19 are checked on the dial for radial distance from the town or city in question in order to determine the right model antenna to be installed, by reference to the tables 8–12. Only use of the half-portion 14 of the dial 6 has been mentioned, that being the part used most often. However, red dot stations numbered 2 to 13 are VHF and are so indicated by color and numbering on map 19, while green dot stations numbered 14–83 are UHF and are so indicated by color and numbering on the map 19. Stations numbered 6 and 7 are FM and are shown by red dots 17 the same size as for the VHF stations 2–5 and 8–13. In certain locations where the problem is to choose the best model antenna for VHF and FM only, then the quadrant 20 of the dial 6 is used in a similar way as the half 14, the outer band 21 of quadrant 20 being for "deep fringe VHF antenna" designated by key number 8, namely, model #32–2010. Quadrant 22 is used similarly in choosing the best model antenna for only UHF, only two models being available to choose from in that case, as seen by key numbers 9 and 10. Finally, where area TV stations do not telecast from the same direction, a rotor is recommended. By coloring bands contrastingly in the half 14 of the dial 6, it is easier to make a final reading, knowing, for example, that the blue band is 1, the yellow band 2, the green band 3, and red band 4. In the shorter bands for quadrants 20 and 22 there is no advantage or need for such coloring.

In operation, the dial card 4 is handy to use because it contains everything needed for selection of an antenna when a map 19 for use with it is available, the latter showing the location of all the VHF and UHF stations in the reachable vicinity of any town or city by means of red dots 17 for VHF and FM and green ones 18 for UHF, all these dots bearing the numbers of their channels, 2–13 for VHF and FM, and 14–83 for UHF. Once the antenna choice has been narrowed down to a certain band with a certain key number 1–10, it remains only to check the tables 8–11 for the model number. Without this logical engineering approach the customer and the salesman or installation man had little or nothing but guesswork to go on. Under those conditions it is no wonder the results were so bad.

To illustrate how, by turning the dial 6 about its center 15 on the city's dot on the map, one can count the number of stations falling within the reception radius of any given model of antenna, I shall, for convenience, consider only the half portion 14 of the dial, as, of course, the same principle applies to the two remaining quadrants 21 and 22:

(1) Taking the radius for key number 1 and instead of turning the dial relative to the dot 16 for Rockford, Illinois, drawing a circle on the map of FIG. 3, it is seen that eight stations are included and three or four others are probably reachable with model #32–506, if a rotor is added;

(2) Similarly, with the slightly larger radius for key number 2, drawing a second circle, whereby seventeen stations are included and are therefore reachable with model #32–509, if a rotor is added;

(3) Similarly, with the still larger radius for key number 3, drawing a third circle, and, noting that this does not, in this instance add materially to the number of stations, discarding model #32–516 as unsuitable here or of no appreciable advantage over model #32–509, and (4) Similarly, with the largest radius for key number 4, drawing the fourth circle, whereby six or eight or even more stations are reachable with model #32–524, assuming a rotor is used.

The need for a rotor is nearly universal as, in most cases, the direction of telecasting is otherwise not favorable and good reception is impossible.

It is believed the foregoing description conveys a good understanding of the objects and advantages of my invention. The appended claims have been drawn to cover all legitimate modifications and adaptations.

I claim:

1. Antenna selecting means comprising, in combination, a map on which the locations of towns and cities are marked and also the locations of transmitting stations, a transparent circular dial that is marked off in arcuate bands from its center on a scale corresponding to the scale of the map, the bands being identified by different captions, and a table of antenna models having different ranges, the models being given captions by which they are identifiable with certain of said bands on the dial, whereby an antenna having the range appropriate for reception in a given town or city of signals from certain stations can be selected for a customer in the given town or city by placing the dial on the map with the center of said dial on the location mark of the given town or city and noting by turning the dial relative to said mark as a center whether the stations designated come within the band on said dial representing said antenna or come within another band on said dial representing another model of said antennas.

2. Antennas selecting means as set forth in claim 1, wherein certain of said bands are colored contrastingly to facilitate the use of the dial.

3. Antenna selecting means as set forth in claim 1, wherein one quadrant of the dial is devoted to UHF antennas and marked off in arcuate bands appropriate for a plurality of models of antennas having ranges of equivalent to the distances represented by the radii of these arcs.

4. Antenna selecting means as set forth in claim 1, wherein one quadrant of the dial is devoted to VHF and FM antennas and marked off in arcuate bands appropriate for a plurality of models of antennas having ranges equivalent to the distances represented by the radii of these arcs.

5. Antenna selecting means as set forth in claim 1, wherein one quadrant of the dial is devoted to UHF antennas and marked off in arcuate bands appropriately for a plurality of models of antennas having ranges equivalent to the distances represented by the radii of these arcs, another quadrant of said dial being devoted to VHF and FM antennas and marked off in arcuate bands appropriate for a plurality of models of antennas having ranges equivalent to the distances represented by the radii of these arcs.

6. Antenna selecting means as set forth in claim 1, wherein one quadrant of the dial is devoted to UHF antennas and marked off in arcuate bands appropriate for a plurality of models of antennas having ranges equivalent to the distances represented by the radii of these arcs, another quadrant of said dial being devoted to VHF and FM antennas and marked off in arcuate bands appropriate for a plurality of models of antennas having ranges equivalent to the distances represented by the radii of these arcs, the rest of said dial being for all of the antennas (UHF, VHF, and FM) and marked off in arcuate bands appropriate for a plurality of models of antennas having ranges equivalent to the distances represented by the radii of these arcs.

7. Antenna selecting means as set forth in claim 1, wherein the bands are numbered 1 on up to the highest number, according to the number of models, the different appropriate models in the table being correspondingly numbered.

References Cited

UNITED STATES PATENTS

| | | | |
|---|---|---|---|
| 2,141,696 | 12/1938 | Rodd et al. | 33—1 |
| 2,370,305 | 2/1945 | Guditz | 35—12 |
| 2,486,502 | 11/1949 | Spafford | 35—40 |
| 2,494,536 | 1/1950 | Atwood | 235—89 |
| 3,100,353 | 8/1963 | Chamberlin | 35—46 |

FOREIGN PATENTS

| | | |
|---|---|---|
| 125,503 | 5/1928 | Switzerland. |

LOUIS J. CAPOZI, Primary Examiner